(12) United States Patent
Berger et al.

(10) Patent No.: US 6,958,369 B2
(45) Date of Patent: Oct. 25, 2005

(54) COMPONENT FOR PRODUCING POLYMER MIXTURES ON THE BASIS OF STARCH AND A METHOD FOR PRODUCING THE SAME

(75) Inventors: Werner Berger, Dresden (DE); Lutz Jeromin, Radebeul (DE); Uta Mierau, Dresden (DE); Guntram Opitz, Dresden (DE)

(73) Assignee: Biop Biopolymer Technologies AG, Dresden (DE)

( * ) Notice: Subject to any disclaimer, the term of this patent is extended or adjusted under 35 U.S.C. 154(b) by 56 days.

(21) Appl. No.: 09/403,557

(22) PCT Filed: Nov. 16, 1998

(86) PCT No.: PCT/DE98/03385

§ 371 (c)(1),
(2), (4) Date: Oct. 25, 1999

(87) PCT Pub. No.: WO99/25756

PCT Pub. Date: May 27, 1999

(65) Prior Publication Data

US 2002/0061943 A1 May 23, 2002

(30) Foreign Application Priority Data

Nov. 17, 1997 (DE) .......................................... 197 50 846

(51) Int. Cl.$^7$ .............................. C08L 3/00; C08L 89/00
(52) U.S. Cl. ......................... 524/47; 524/492; 524/493; 524/494
(58) Field of Search .......................... 524/47, 503, 492, 524/493, 494

(56) References Cited

U.S. PATENT DOCUMENTS

| | | | |
|---|---|---|---|
| 5,106,890 A | | 4/1992 | Maruhashi et al. ............ 524/47 |
| 5,439,953 A | | 8/1995 | Ritter et al. .................... 524/47 |
| 5,500,465 A | * | 3/1996 | Krishnan et al. .............. 524/47 |

FOREIGN PATENT DOCUMENTS

| | | |
|---|---|---|
| DE | 41 16 404 | 11/1992 |
| DE | 41 17 628 | 12/1992 |
| DE | 41 22 212 | 1/1993 |
| DE | 41 43 132 | 7/1993 |
| DE | 42 09 095 | 9/1993 |
| DE | 199 38 672 | 6/1999 |
| EP | 0 327 505 | 8/1989 |
| EP | 0 404 723 | 12/1990 |
| EP | 407 350 | 1/1991 |
| WO | WO 91/02024 | 2/1991 |
| WO | WO 92/19680 | 11/1992 |
| WO | WO94/04600 | 3/1994 |
| WO | WO96/37544 | * 11/1996 |
| WO | WO97/27154 | 7/1997 |

OTHER PUBLICATIONS

Stepto et al. (1987) "Injection Moulding of Natural Hydrophilic Polymers in the Presence of Water" Chimia 41, No. 3, pp. 76–81.
Felix H. Otey, William M. Doane in"Starch: Chemistry and Technology", ed. By R.L. Whistler, J.N. Bemiller, E.F. Paschall, pp. 399–400, Academic Press 1984.
Mass Spectrum of the products of the pyroloysis of the component.
Comparative NMR–test.

* cited by examiner

*Primary Examiner*—James J. Seidleck
*Assistant Examiner*—U. K. Rajguru
(74) *Attorney, Agent, or Firm*—Gudrun E. Huckett

(57) ABSTRACT

The invention relates to a component for producing thermoplastically moldable, biodegradable and bright polymer mixtures based on starch, with good dimensional stability in water. The dimensional stability in water and the biodegradability of said component are adjustable and the component can be used for producing sheet materials, semi-finished or finished products, for example for packagings, containers, articles required in horticultural nurseries, and for other purposes. The invention, furthermore, relates to a process for producing the component from polyvinyl acetate and alkali silicate. A suspension of polyvinyl acetate is hydrolized and saponified in the batch process in the presence of catalytic additions such as, in particular glycerol, by adding the alkali silicate and hydroxides at high temperatures. Organosilicates of high homogeneity and fineness are formed. Additions of said component in small amounts have a positive effect on the phase compatibility of the hydrophilic starch and a hydrophobic polymer such as polyvinyl acetate in the course of preparation of the blend in the extruder. The properties of the extruded products are substantially enhanced.

23 Claims, No Drawings

COMPONENT FOR PRODUCING POLYMER MIXTURES ON THE BASIS OF STARCH AND A METHOD FOR PRODUCING THE SAME

BACKGROUND OF THE INVENTION

1. Field of the Invention

The invention relates to a component consisting of polyvinyl acetate and alkali water glass for producing thermoplastically deformable, biodegradable and bright polymer mixtures based on starch, with good dimensional stability in water, which can be applied for the manufacture of sheet material, semi-finished and finished products, for example for packagings, containers and articles required in horticultural nurseries, in particular growing or cultivation aids, as well as in other fields of application. The invention, furthermore, relates to a process for producing said component.

2. The Prior Art

Numerous methods have become known in the last few years for producing and shaping thermoplastic starch (TPS) either alone or in the form of a polymer mixture or polymer melt or polymer blend (in the following referred to as a polymer mixture). Said methods were developed with the goal to open up new or expanded fields of application for regrowing raw materials. The basis of all inventions that have become known heretofore is the finding that the grainy structure of native starch can be changed into thermoplastic material first with defined proportions of water and/or lower polyfunctional alcohols such as ethylene glycol, propylene glycol, glycerol, 1,3-butane-diol, diglyceride, and the respective ethers, but also with compounds such as dimethyl sulfoxide, dimethyl formamide, dimethyl urea, dimethyl acetamide, and/or other additives, through thermomechanical breakdown with the help of conventional extruders; and that such materials then can be molded.

The useful value of the extrudate and of the products produced from the latter is low. In particular, the material is highly hydrophilic.

More recent proposals are dealing with the admixture of synthetically obtained waterproof polymers such as, for example polyethylene, polypropylene, polycaprolactone, as mixing components for starch. In this connection, however, the problem arises that the compatibility between the polymer components is inadequate, and that the biodegradability and also the cost structure become unfavorable.

The prior art is extensively documented in the relevant literature. Reference is made in this connection, for example to the publication by R. F. T. Stepto et al "Injection Molding of Natural Hydrophilic Polymers in the Presence of Water", Chimia 41 (1987), No. 3, pp. 76-81, and the literature cited there, as well as, for example to patents DE 4116404; EP 0327505; DE 4038732; U.S. Pat. No. 5,106,890; DE 4117628; WO 94/04600; DE 4209095; DE 4122212, EP 0404723; and EP 407350.

In DE 40 38 732, the starch plasticized with water and glycerol is processed in the extruder to a polymer mixture predominantly with polyvinyl acetate. The extrudate exhibits superior resistance to water as compared to TPS. With higher amounts of starch components, the extrudate or the bottles produced therefrom take on a yellowish to brownish color. This limits the starch component to below 50%.

A slightly acid to neutral component consisting of polyvinyl acetate and water glass has already been proposed (DE 195 33 800) in which a polymer mixture of starch and a hydrophobic polymer, e.g. polyvinyl acetate, can be extruded. The component is produced from water glass and polyvinyl acetate as well as, if need be, further acid components for adjusting the pH, by the extrusion process with intensive mixing. It has been found that even only minor additions of said component lead to a significant qualitative improvement of the extrudate and of the products manufactured from the latter. As compared to the prior art, native starch can be used in considerably greater amounts without or with only minor discoloration and while maintaining or enhancing the dimensional stability in water. The component obviously contributes to the fact that the two phases, which are not compatible in mixture per se, render the hydrophilic thermoplastic starch and the hydrophobic polymer miscible to a certain degree.

Further tests have shown that the quality of the final products has to be improved even further with respect to dimensional stability in water and strength. In particular, it has not been possible to manufacture thin sheet materials with a thickness of below about 300 $\mu$m.

SUMMARY OF THE INVENTION

Starting with the goal to make even more use of regrowing raw materials for the economical manufacture of products that are compatible with the environment, the present invention developed based on the problem of proposing a component with which it is possible to extrude from thermoplastic starch and a hydrophobic polymer, for example polyvinyl acetate, qualitatively higher valued, thermoplastically moldable and biodegradable polymer mixtures, as well as on the problem of proposing a process for producing said component from polyvinyl acetate and alkali water glass.

The component is obtained according to the invention by hydrolizing and saponifying the polyvinyl acetate in the batch process in the presence of catalytic additions of low-molecular organic mono-, di- and trihydroxyl compounds (e.g. methanol, ethanol, ethylene glycol, glycerol) with a continuous addition of basically reacting compounds and the alkali silicate.

The component contains organosilicates of high homogeneity and fineness consisting of partially saponified polyvinyl acetate and alkali silicate solution, additional reaction products produced in situ, as well as residues of the catalyst employed in the production of said component.

Characteristic of the way in which the reaction is controlled is that the polyvinyl acetate is loaded first in an about 50% suspension with the catalyst, and that the basic compounds are added under thorough mixing before the alkali silicate solution is added, or together with the latter.

It has been found that it is possible with said component to extrude polymer mixtures with high starch proportions analogous to DE 195 33 800. It is shown in the examples of execution in greater detail that the products manufactured from said polymer mixtures have a distinctly higher quality with respect to a number of parameters. In particular, it is possible already now to produce sheets with a thickness of less than 100 $\mu$m.

Various modifications have already been found.

Especially if the polyvinyl is presaponified with calcium hydroxide, a component is formed with which biodegradable polymer mixtures of high strength can be produced. The best values to date were obtained with calcium hydroxide and sodium disilicate (instead of water glass).

The quality of the final products is enhanced even if native starch and vinylacetate or polyfunctional silane (e.g. Dynasilane GLYMO of the Hüls Company) are added in the manufacture of the component in small amounts.

The component is solid at room temperature and a structured liquid at above 40° C. Following removal from the mixer, excess water can be removed by centrifuging. A residual moisture of 35% to 40% usually remains in the product. The catalyst employed is contained in said residual moisture about proportionally to the amounts of catalyst and liquid used.

The invention is explained in greater detail in the following with the help of a number of exemplified embodiments.

DETAILED DESCRIPTION OF PREFERRED EMBODIMENTS

The various components were produced in a discontinuously operating solid/liquid mixer of the firm Gebrüeder Lödige Maschinenbau GmbH. The mixer is equipped with centrifuging gear controllable via the speed (about 350 rpm max.), and with a blade head operating at constant speed. The mixture was heated via the twin jacket of the mixer by means of a pressure-superposed tempering system, or with direct steam.

After the reaction temperature of 120° to 140° C. was reached, reaction times of from 1 to 2 hours were required.

The following feed stock was charged: 55% polyvinyl acetate suspension; 99.5% glycerol; 40% Na water glass 37/40; as well as NaOH and/or $Ca(OH)_2$.

For determining the quality, polymer mixtures based on polyvinyl acetate and starch each containing 10% of the respective component used were extruded analogous to DE 195 33 800, and test specimens and flat sheets were produced from said polymer mixtures. The mass ratio of starch to polyvinyl acetate amounted to 3:1 in all tests without change.

The degree of swelling (SW in %) and the solubility (SO in %) were determined on the test specimens, which were stored in water at room temperature for a period of 24 hours. In this connection, the degree of swelling corresponds with the quotient based on the mass difference of undried swollen test specimen ($m_{SW}$) and the same dried test specimen prior to swelling ($m_A$) relative to the starting mass of the dry test specimen prior to swelling ($m_A$):

$$SW = \frac{m_{sw} - m_A}{m_A} \text{ (in \%).}$$

The solubility is calculated based on the mass of the dry starting specimen ($m_A$), reduced by the mass of the watered dried specimen ($m_w$) and related to the mass of the dried starting specimen:

$$SO = \frac{m_A - m_W}{m_A} \text{ (in \%).}$$

The tensile strength ($\sigma$ in MPa), elongation ($\epsilon$ in %) and the E-modulus (in MPa) were determined on test specimens in the form of shoulder rods (L=75 mm; $W_{shoulder}$=13 mm; $W_{bridge}$=4 mm). Said rods were punched out at 130° C. from extruded flat sheets, and stored over 24 hours at 50% relative air humidity. The test speed came to 200 mm/min; the measurements were carried out in accordance with ISO 527.

The numerical values specified in the table (see below) represent average values based on several comparable measurements.

EXAMPLE 1

1600 g polyvinyl acetate suspension and 120 g glycerol was loaded by weight in an unheated laboratory mixer and, under stirring with the centrifuging gear (n 300–350 rpm), heated to the reaction temperature of 140° C. 900 g of the sodium water glass solution, enriched with 171 g sodium hydroxide, was continuously metered into the hot reaction medium via a micro-dosing pump against the pressure existing in the interior of the mixer, said pressure corresponding with the temperature and the water content. The dosing rate was selected in such a way that the desired reactions were substantially completed when the dosing was stopped. In the present example, the metering and reaction time amounted to 2 hours. In addition to the centrifuging gear, the blade head was switched on throughout the entire metering time as well. Following metering of the sodium glass water solution, flushing was carried out with 0.25 N soda lye in order to feed the rest of the water glass into the reaction mixture.

The properties of the extruded polymer mixture are specified in the following table under Example 1.

For comparison purposes, a component was prepared analogous to DE 195 33 800, but also by the batch process (thus under superior conditions). The properties of the extruded polymer mixture are contained in the following table under Example 0.

It is obvious that the values of the extruded polymer mixture prepared with the component produced according to the invention are enhanced. Most of all, however, it was possible to produce substantially thinner sheets than heretofore.

EXAMPLE 2

Same as Example 1; however, instead of the amount of sodium hydroxide added to the sodium water glass in 1, an equimolar amount of calcium hydroxide was added to the reaction batch. Following heating, the water glass was metered into the mixture with the micro-dosing pump and the reaction was completed according to the procedure described in Example 1.

EXAMPLE 3

The calcium hydroxide is added by weight to the polyvinyl acetateglycerol mixture and intimately homogenized. The preparation is subsequently heated to the reaction temperature and maintained at said temperature for 1 hour. Metering of the sodium water glass was subsequently carried out as in Examples 1 and 2.

The degree of presaponification can be varied by varying the reaction time and reaction temperature as well as the concentration of the basic starting substances.

The resistance to water of the polymer mixture is enhanced by using calcium hydroxide and particularly by varifying the presaponification (see table, Examples 2 and 3).

EXAMPLE 4

5% native potato starch based on the weighed amount of polyvinyl acetate suspension was added to the reaction batch prior to saponification, and reacted as described in Example 1. A certain deterioration occurred as compared to the values obtained in Example 1 (table, Example 4).

EXAMPLE 5

5% potato starch and 0.5% vinylacetate based on the weighed amount of the polyvinyl acetate suspension was added to the reacted reaction product obtained from polyvinyl acetate, sodium hydroxide and sodium water glass, and an ester interchange was carried out for 1 hour at 40° C. The product properties showed a substantial improvement (table; Example 5).

EXAMPLE 6

Adding 5% of a polyfunctional silane (Dynasilane GLYMO, Hüls Company) based on the mass of silicate introduced into the component by the sodium water glass has a positive effect on the properties of the extruded compound as well (see table; Example 6). Therefore, the weighed portion of silane was admixed to the finished component at a temperature of below 100° C. The mass was heated to 120° C. and stirred for20 minutes at said temperature.

EXAMPLE 7

A further possibility of influencing the spectrum of the properties of extruded starch/polyvinyl acetate mixtures becomes accessible through the synthesis of a component consisting of polyvinyl acetate suspension partially saponified with calcium hydroxide, and sodium disilicate. The composition of the reaction batch is selected in this connection in such a way that it corresponds with the degree of saponification and the silicate content of the component according to Example 1. The polyvinyl acetate suspension, the calcium hydroxide and the sodium disilicate are mixed by weight, heated to the reaction temperature, and maintained at said temperature over a period of time (2 hours) conforming to the metering of the water glass (table; Example 7).

Table: Property values of the polymer mixtures extruded with the different components (Examples 1 to 7) as defined by the invention, and with the comparative component (Example 0).

| Example | Components | SW (%) | SO (%) | σ (MPa) | ε (%) | E-modulus (MPa) |
|---|---|---|---|---|---|---|
| 0 | Recipe according to DE 195 33 800 | 142 | 20 | 8.0 | 80 | 76 |
| 1 | NaOH dissolved in sodium water glass solution | 113 | 16 | 10.9 | 74 | 88 |
| 2 | Ca(OH)$_2$, without pre-saponification | 95 | 17 | 9.8 | 91 | 126 |
| 3 | Ca(OH)$_2$ with pre-saponification | 90 | 16 | 10.5 | 77 | 155 |
| 4 | with potato starch | 129 | 21 | 6.7 | 118 | 23 |
| 5 | with potato starch and vinyl acetate | 105 | 14 | 12.6 | 62 | 293 |
| 6 | with dynasilane GLYMO | 106 | 15 | 13.4 | 75 | 216 |
| 7 | with Ca(OH)$_2$ and sodium disilicate | 87 | 15 | 15.4 | 56 | 464 |

What is claimed is:

1. A process for producing a component for producing polymer blends from thermoplastic starch and a hydrophobic polymer, the method comprising the steps of:
   a) providing an aqueous dispersion of polyvinyl acetate;
   b) adding a catalyst, selected from the group consisting of mono-hydroxy compounds, dihydroxy compounds, and trihydroxy compounds, to the aqueous dispersion;
   c) presaponifying the aqueous dispersion of polyvinyl acetate by adding an alkaline substance to the aqueous dispersion;
   d) providing an alkali silicate solution;
   e) reacting in a batch mixer the presaponified polyvinyl acetate of step c) with the alkali silicate solution of step d) by adding, while stirring, the alkali silicate solution to the presaponified polyvinyl acetate of step c) over a period of at least one hour to form organosilicates, wherein a combined water contents of the presaponified polyvinyl acetate and of the alkali silicate solution is greater than 40%.

2. The process according to claim 1, wherein in the step c) the alkaline substance is continuously added until a degree of hydrolysis of 10% to 40% is reached and wherein in the step e) the reaction is carried out until a final degree of hydrolysis of 30% to 85% is reached.

3. The process according to claim 1, wherein a final pH of 7 to 8.5 is reached in step e) upon completion of the reaction.

4. The process according to claim 1, wherein in step c) the alkaline substance is calcium hydroxide and wherein calcium hydroxide is added until a degree of presaponification of 10% to 40% has been reached.

5. The process according to claim 1, wherein the catalyst is selected from the group consisting of methanol, ethanol, ethylene glycol, diethylene glycol, triethylene glycol, glycerol, and mixture thereof.

6. The process according to claim 1, wherein the catalyst is added in an amount of 0.5% to 20% by weight of the weight of polyvinyl acetate.

7. The process according to claim 1, wherein the step c) is carried out at a temperature of 100° C. to 160° C.

8. The process according to claim 1, wherein the polyvinyl acetate and the alkali silicate are employed in weight proportions, based on dry weight, of 50:50 to 80:20.

9. The process according to claim 1, wherein the alkali silicate is comprised at least partially of sodium disilicate and hydroxide.

10. The process according to claim 1, further comprising the step of adding organofunctional silanes subsequent to step e).

11. The process according to claim 10, wherein the organofunctional silane is added in an amount of 3% to 15% by weight of the alkali silicate contained in the alkali silicate solution.

12. The process according to claim 1, further comprising the step of adding starch subsequent to step e).

13. The process according to claim 10, wherein the starch is added in an amount 5% to 15% by weight of the polyvinyl acetate.

14. The process according to claim 12, further comprising the step of adding vinyl acetate together with the starch.

15. The process according to claim 14, wherein the vinyl acetate is added in an amount of 0.5% to 1.5% by weight of the polyvinyl acetate.

16. A process for producing a component for producing polymer blends from thermoplastic starch and a hydrophobic polymer, the method comprising the steps of:
   a) providing an aqueous dispersion of polyvinyl acetate;
   b) pretreating the aqueous dispersion of polyvinyl acetate by adding a catalyst, selected from the group consisting of mono-hydroxy compounds, dihydroxy compounds, to the aqueous dispersion;

c) providing a solution comprising alkali silicate and an alkaline substance;

d) reacting in a batch mixer the pretreated polyvinyl acetate of step b) with the solution of step c) by adding while stirring over a period of at least one hour the solution of step c) to the pretreated polyvinyl acetate of step b) to form organosilicates, wherein a combined water contents of the pretreated polyvinyl acetate of step b) and of the solution of step c) is greater than 40%.

17. A component for producing polymer blends form thermoplastic starch and a hydrophobic polymer, the component prepared according to the method of claim 1, wherein the component has a water content of 35% to 40%.

18. A component for producing polymer blends form thermoplastic starch and a hydrophobic polymer, the component comprised of:

organosilicates, formed by reacting an aqueous solution of polyvinyl acetate and an aqueous solution of alkali silicate in the presence of a catalyst, selected from the group consisting of mono-hydroxy compounds, dihydroxy compounds, and trihydroxy compounds, and an alkaline substance over a period of at least one hour, wherein the catalyst and the water of the polyvinyl acetate solution and of the alkali silicate solution are present in an amount of 35 to 40% of the weight of the component;

wherein the component has a pH value of 7 to 8.5.

19. The component according to claim 18, wherein the polyvinyl acetate and the alkali silicate are contained in weight proportions, based on dry weight, of 50:50 to 80:20.

20. The component according to claim 18, further comprising at least one of organofunctional silanes, vinyl acetate, and starch, evenly distributed in the component.

21. The component according to claim 20, wherein the organofunctional silane is contained in an amount 3% to 15% by weight of the alkali silicate.

22. The component according to claim 20, wherein the vinyl acetate is added in an amount of 0.5% to 1.5% by weight of the polyvinyl acetate.

23. The component according to claim 20, wherein the starch is contained in an amount 5% to 15% by weight of the polyvinyl acetate.

* * * * *